United States Patent [19]
Duh

[11] Patent Number: 4,953,448
[45] Date of Patent: Sep. 4, 1990

[54] APPARATUS OF HEAT PREVENTER OF A CAR

[76] Inventor: Gabri C. B. Duh, No. 267, Lane 376, Sec. 1, Kwang-fu Rd., Hsinchu, Taiwan

[21] Appl. No.: 394,722

[22] Filed: Aug. 16, 1989

[51] Int. Cl.$^5$ .............................................. B60H 1/24
[52] U.S. Cl. ...................................... 98/2.02; 98/2.13
[58] Field of Search .................... 98/2.02, 2.12, 2.13, 98/94.1, 900

[56] References Cited

U.S. PATENT DOCUMENTS

| 2,528,301 | 10/1950 | Doe ........................................ 98/94.1 |
| 2,746,372 | 5/1956 | Smith et al. ........................... 98/2.02 |
| 4,773,310 | 9/1988 | Corwin ............................. 98/94.1 X |
| 4,838,151 | 6/1989 | Shin-Chin ............................ 98/94.1 |

FOREIGN PATENT DOCUMENTS

| 3624291 | 1/1988 | Fed. Rep. of Germany ....... 98/2.13 |
| 31835 | 2/1986 | Japan ................................. 98/900 X |
| 2197944 | 6/1988 | United Kingdom ................. 98/2.02 |

Primary Examiner—Harold Joyce
Attorney, Agent, or Firm—Notaro & Michalos

[57] ABSTRACT

An apparatus of heat preventer of a car which uses solar energy to motivate two sets of a motor and fans to disturb the inside air and exhaust the heat air out for preventing the degree of temperature inside a stopped car from rising too high.

1 Claim, 3 Drawing Sheets

APPARATUS OF HEAT PREVENTER OF A CAR

BACKGROUND OF THE INVENTION

This invention relates to an apparatus cooling the interior of a car, and more particularly to a solar powered ventilation fan, which can reduce the temperature in the car when it stops.

In summer, while stopped under the sun for a period of time, the inside temperature of the car will rise in an unendurable high manner. The reason is that the car is almost closed, and the air inside the car is heated rapidly. When a driver is going into the car, he must endure this high temperature and suffer great pain. This high temperature in the car disturbs everyone. The known method to solve this problem is to mount a heat resistive paper or to put a shield inside the car windows and windshield. This is not efficient, however, because the air in the car at high temperature can not be exhausted.

SUMMARY OF THE INVENTION

It is the purpose of this present invention to mitigate and/or obviate the above-mentioned drawbacks in the manner set forth in the description of the preferred embodiment.

A primary objective of the present invention is to provide an apparatus for cooling which can keep the inside temperature of the car maintain at a lower level.

Another objective of this present invention is to provide a ventilation apparatus which has fans to exhaust heat air and reduce the temperature in the car.

A further objective of this present invention is to provide a solar cooling apparatus which need not use the energy source of the car.

Further objectives and advantages of the present invention will become apparent as the following description proceeds, and from the features of novelty which are set forth in the claims annexed to and forming a part of this invention.

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
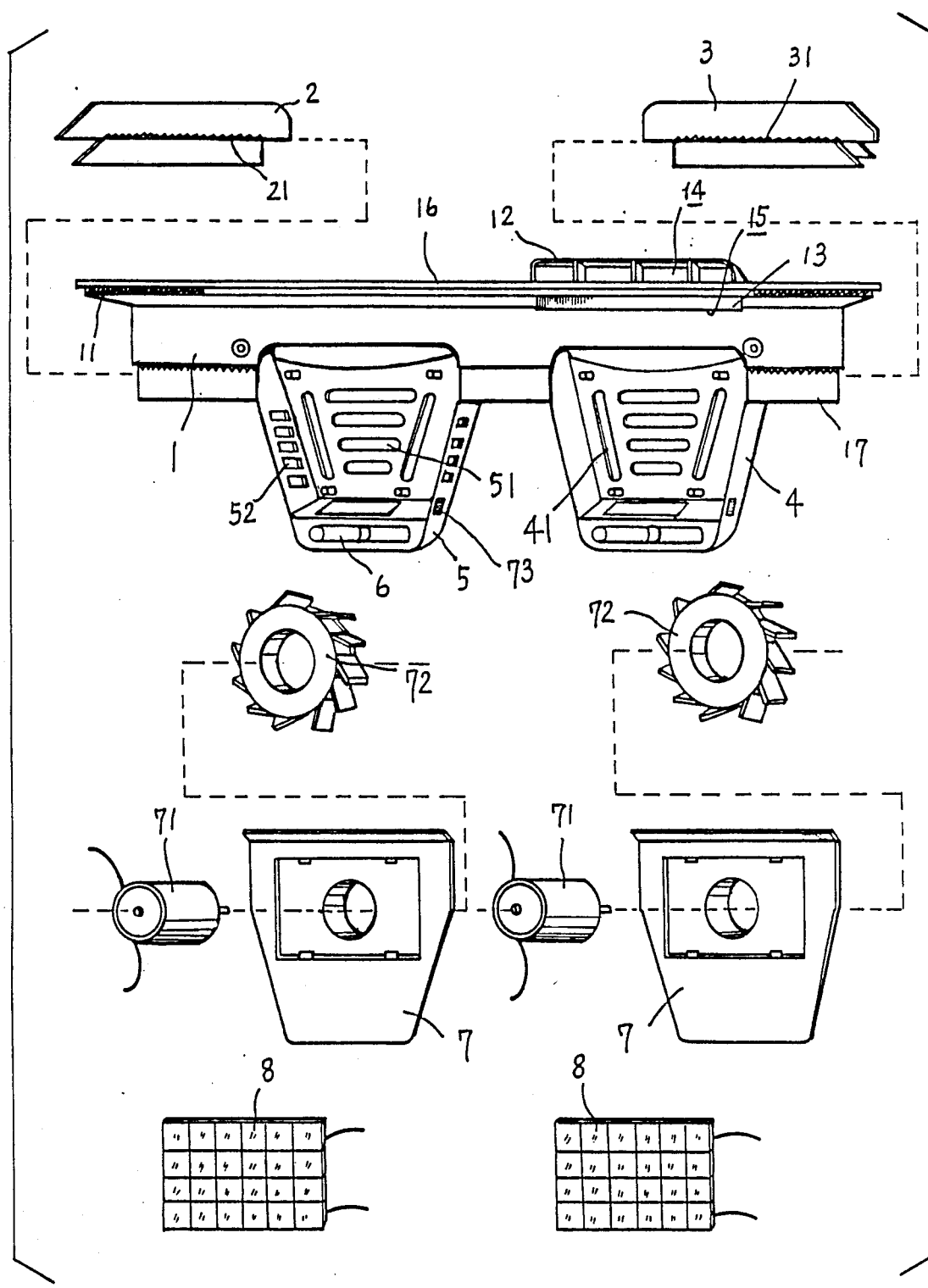
FIG. 1 is an exploded perspective view according to the present invention.
Figure 2:
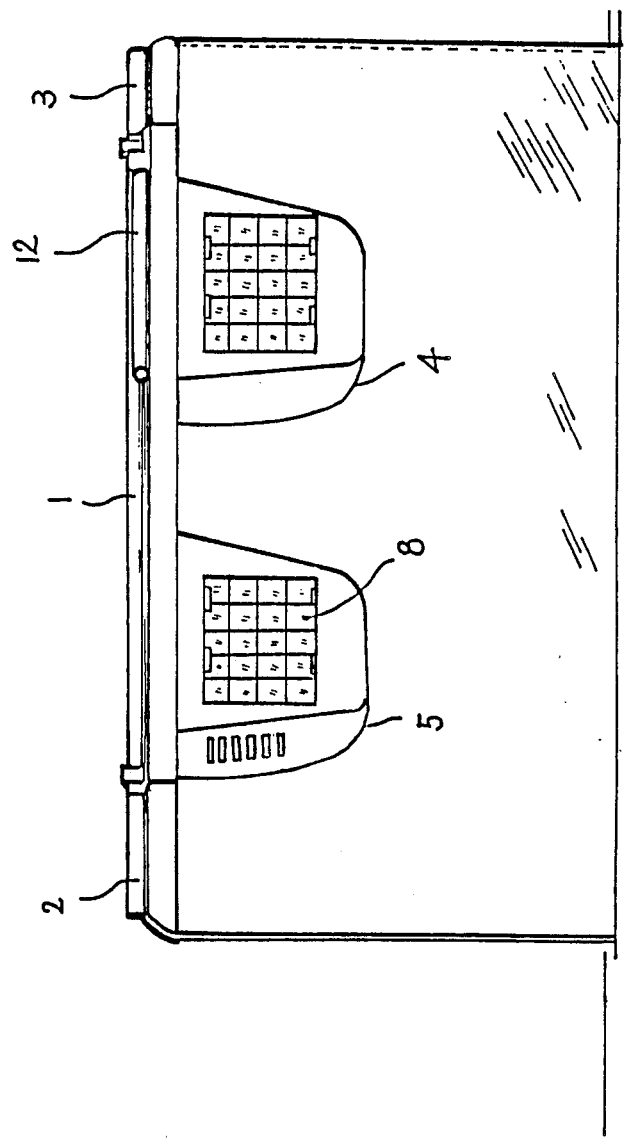
FIG. 2 is an assembled explanatory view of this invention.

Now referring to FIG. 1 first, it can be seen that the present invention includes a body w with a U-shaped groove and tooth profiles 11 inside both ends thereof. Two plates 2 and 3 both having tooth racks 21 and 31 thereon, engage the tooth profiles 11. Various engaging positions between plates 2 and 3, and body 1 make various total lengths for the body possible which is suited to different sizes of cars, in use as shown in FIG. 2. The body is upside-down and has its U-shaped groove on the upper edge of a car window. Both sides of an outer panel 16 of body 1 are provided with a curved shield 12 and a gap 13 with relative vents 14 and 15, where, therefore, the air can be communicated inside and outside. The inner panel 17 of the body 1 connects with two boxes 4 and 5, both of which have energized batteries 6 provided at the bottom, a seat 7 mounted thereinside, and a fan 72 as well as a motor 71 thereon, while switches 73 are extended sidely and the boxes are closed by two solar energy plates. The only difference is in box 4 only having back ventages 41, and in box 5 having back ventages 51 and side ventages 52.

Figure 3:
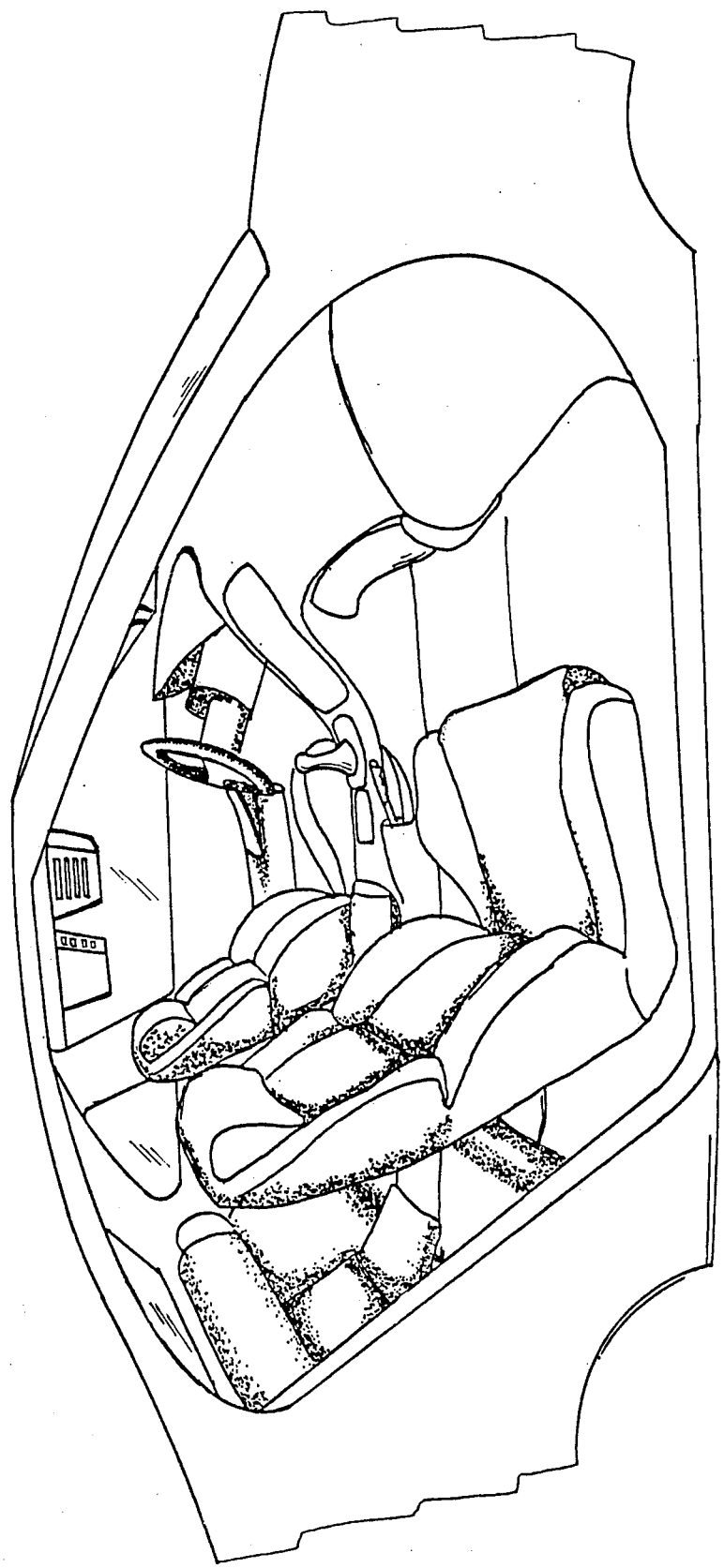
FIG. 3 is an exemplary embodiment in accordance with the present invention.

In use, referring to FIGS. 2 and 3, the two solar plates 8 energize continually the batteries 6. When the driver wants to stop and leave the car for a period of time, he can turn on the switches 73 to motivate the motors 71 rotate the fans 72. The fans 72 in the box 5 will disturb the air inside the car through the vantages 51, 52 and the fans in the box 4 can suck the air of high temperature inside the car, and exhaust them out from the vents 14, 15. It can be understood that the heat air in high degree of temperature can thus be undoubtly exhausted out, while the cooler air come into the car from preset ventilation. This is assurable for reducing the temperature in the car and maintain it in a lower degree when the car is under the sun directly, and do not need any energy source of the car.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. An apparatus for ventilating the interior of a car, comprising:
    a body having a U-shaped groove for receiving the upper edge of a car window, the body having tooth profiles at opposite ends thereof, the body having an outer panel with a curved shield and vent therein for communicating air outside of the car with air inside of the car, and an inner panel;
    a pair of boxes connected to said inner panel for being positioned in a car, each box having a battery space at the bottom thereof for receiving at least one battery, and each box having a seat for receiving a motor and fan combination therein for connection to a battery for circulation of air, one of said boxes having a housing with a plurality of inlet vents and a plurality of outlet vents for receiving and discharging air through said housing of the one box for circulation of air within the car, the other box having a housing with inlet vents only, the housing of the other box being operatively connected to the curved shield and vent for discharging air from the interior of the other box outwardly through the curved shield and vent;
    a motor and fan combination mounted in each of said boxes;
    a switch connected to a side of each of said boxes and operatively connected to each respective motor and fan combination for activation thereof;
    a solan panel connected over each box on a surface thereof facing said outer panel for receiving sunlight from outside of said car to energize batteries in said boxes; and
    a pair of plates each having a tooth rack for engaging one of the tooth profiles at one end of said body, for varying the overall length of said body with said plates on an upper edge of the window of the car.

* * * * *